United States Patent
Wenger

(10) Patent No.: US 8,028,588 B2
(45) Date of Patent: Oct. 4, 2011

(54) FLOW MEASUREMENT USING NEAR FIELD MICROWAVES

(75) Inventor: Fabian Wenger, Göteborg (SE)

(73) Assignee: Rosemount Inc., Chanhassen, MN (US)

( * ) Notice: Subject to any disclaimer, the term of this patent is extended or adjusted under 35 U.S.C. 154(b) by 23 days.

(21) Appl. No.: 12/566,996

(22) Filed: Sep. 25, 2009

(65) Prior Publication Data

US 2011/0072909 A1 Mar. 31, 2011

(51) Int. Cl.
G01F 1/46 (2006.01)
(52) U.S. Cl. .................................... 73/861.65
(58) Field of Classification Search ............... 73/861.65; 702/49; 324/637
See application file for complete search history.

(56) References Cited

U.S. PATENT DOCUMENTS

| | | | | |
|---|---|---|---|---|
| 5,821,410 | A | 10/1998 | Xiang et al. | 73/105 |
| 5,900,618 | A | 5/1999 | Anlage et al. | 250/201.3 |
| 6,538,454 | B1 | 3/2003 | Frenkel et al. | 324/637 |
| 7,040,168 | B1 * | 5/2006 | Merkel | 73/601 |
| 7,190,175 | B1 * | 3/2007 | Kelly et al. | 324/637 |
| 7,520,667 | B2 * | 4/2009 | Pahlsson et al. | 374/45 |
| 2004/0085077 | A1 | 5/2004 | Nyfors | 324/637 |
| 2004/0244501 | A1 | 12/2004 | Nyfors et al. | 73/861.63 |
| 2007/0124091 | A1 | 5/2007 | Wee | 702/49 |

FOREIGN PATENT DOCUMENTS

| | | |
|---|---|---|
| EP | 0045819 | 10/1980 |
| EP | 0 495 819 B1 | 1/2000 |
| WO | WO 2007/109772 A2 | 9/2007 |
| WO | WO 2008/085065 | 7/2008 |

OTHER PUBLICATIONS

"High-frequency dielectric polarization mechanism in water-in-oil microemulsions below percolation"; Bordi et al., Progr Colloid Polym Sci (2000) 115:44-49 c Springer-Verlag 2000.
"Effect of tip geometry on contrast and spatial resolution of the near-field microwave microscope", Atif Imtiaz and Steven M. Anlage; (Dec. 20, 2005; accepted Jun. 20, 2006; published online Aug. 16, 2006); 8 pages.
"Multiphase Flow Measurement" Class #8110; prior to Dec. 2009, Parviz Mehdizadeh, 12 pages.
"I.7 Principles of Near-Field Microwave Microscopy", Steven M. Anlage et al., SVNY294-Kalinin Jul. 17, 2006; pp. 207-245.
"Microfabricated Near-Field Microwave Probes for Scanning Microscopy", by Y. Wang et al., IEEE, 2003, pp. 855-858.
Copy of Search Report and Written Opinion from corresponding Application No. PCT/US2010/049585, dated Jun. 20, 2011.

* cited by examiner

*Primary Examiner* — Jewel Thompson
(74) *Attorney, Agent, or Firm* — Westman, Champlin & Kelly, P.A.

(57) ABSTRACT

A flow meter for measuring flow rate and flow composition of a process fluid includes a microwave source configured to generate a microwave signal. A probe tip is coupled to the microwave source and in near field proximity to the process fluid. The probe tip is configured to apply the microwave signal to the process fluid. A microwave detector coupled to the probe tip is configured to detect a near field microwave signal from the process fluid in response to the applied microwave signal. Flow calculation circuitry determines flow rate and/or composition of the process fluid as a function of the detected microwave signal.

17 Claims, 3 Drawing Sheets

FLOW MEASUREMENT USING NEAR FIELD MICROWAVES

BACKGROUND OF THE INVENTION

The present invention relates to industrial process controlled monitoring systems. More particularly, the particular invention relates to measurement of flow of multiphase in industrial processes.

Industrial processes are used in the manufacturing and refinement of various fluids or components. Examples include oil refining or distribution, paper pulp facilities, and others. In many instances, it is desirable to measure a flow rate of a process fluid. Various techniques are employed to measure flow rates including differential pressure drop across an orifice plate, vortex sensing techniques, magnetic based techniques and others. However, measurement of flow rate of global multiphase process fluids (process fluids which are not homogenous and may contain multiple different materials in more than one phase such as gas, liquid or solid) has been problematic.

There is an ongoing need to provide measurement techniques for determining flow rate of a multiphase process fluid.

SUMMARY

A flow meter for measuring flow rate of a process fluid includes a microwave source configured to generate a microwave signal. A probe tip is coupled to the microwave source and in near field proximity to the process fluid. The probe tip is configured to apply the microwave signal to the process fluid. A microwave detector coupled to the probe tip is configured to detect a near field microwave signal from the process fluid in response to the applied microwave signal. Flow calculation circuitry determines flow rate and/or composition of the process fluid as a function of the detected microwave signal.

DETAILED DESCRIPTION

Figure 1:
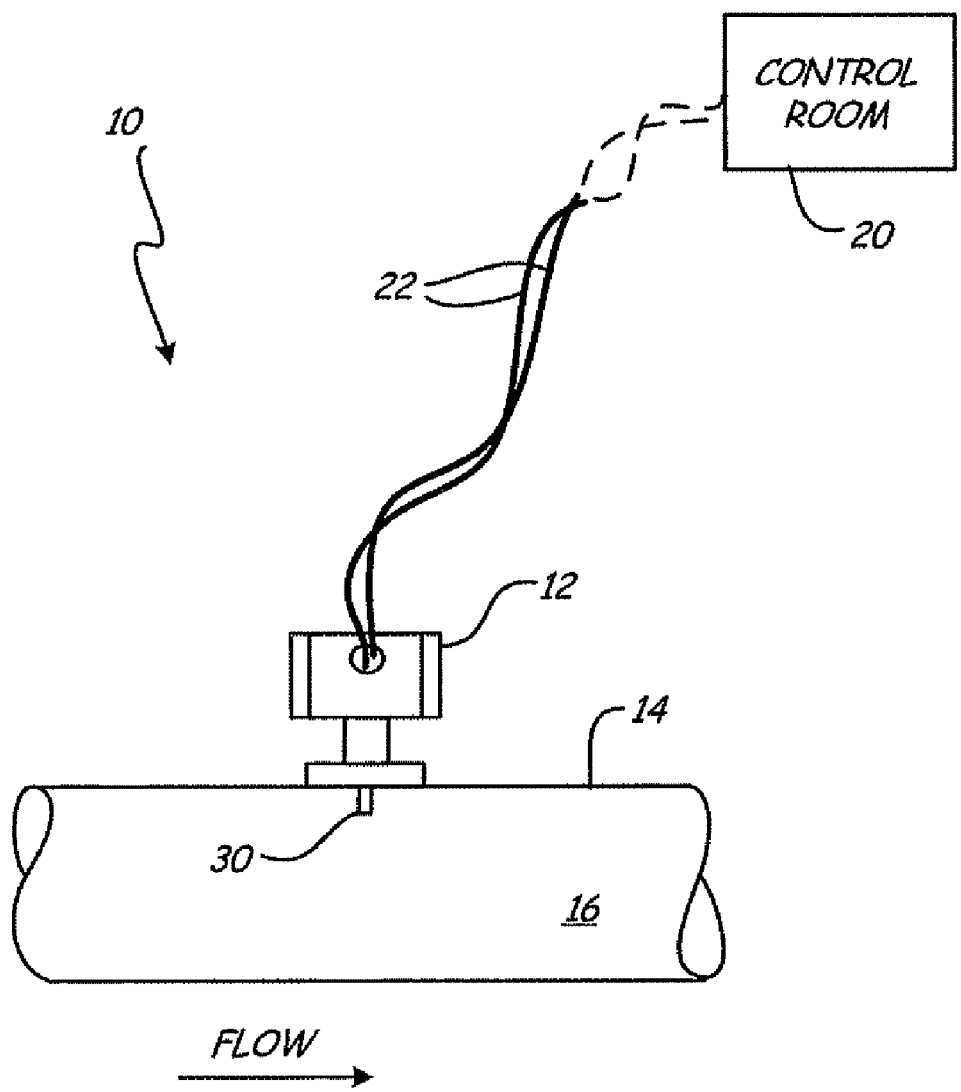
FIG. 1 is a simplified diagram showing a system for controlling or monitoring an industrial process including a flow measurement device for measuring the flow rate and composition of a multiphase process fluid.

Many industrial processes operate with multiphase process fluids. As discussed in the Background section, it is difficult to accurately measure flow rate of multiphase process fluids. One example of a process which utilizes a multiphase process fluid is oil production. In particular, production of oil using advanced recovery techniques may utilize a multiphase fluid. The current trend of raising demand and raising difficulties to increase the output from existing wells has led to the use of water or steam injection as a means to recover oil from wells which have a moderate production capacity.

Oil production from such wells is characterized by a multiphase mixture of water, oil, natural gas and sand. To monitor the flow rate of such wells there are a number of multiphase flow measurement techniques using gamma ray, IR, microwave and ultrasonic sensors, often in combination with a mechanical separation system that creates a bulky and expensive installation.

Radioactive sources are frequently not attractive due to their handling in production. Further, disposal at end-of-life creates a potential hazard. Optical/IR methods may suffer from the sensitivity of optical parts to a dirty environment. Ultrasonic sensors, while having attractive resolution properties, may suffer similarly from sand and dirt, leading to high losses. or high power requirements. While each of the methods also has their merits, microwaves may be used more effectively to characterize multiphase flows.

There are existing efforts to characterize a multiphase flow by dielectric measurements using microwaves. The basis of this method is usually taken as the following "inverse" problem: given the (complex) permittivities $\epsilon_{1,2,3}$ of the constituents and a shape characteristics of the mixture, how can the volume fractions be calculated from a measurement of the permittivity of the mixture $\epsilon_{mix}$. The latter is extracted either from a multi port measurement or the frequency shift or quality factor of a resonant mode (see, for example, http://www.agarcorp.com/, EP0495849B1, and WO2007109772A2).

However, this approach faces a number of problems. One problem is that the permittivities of the constituents (e.g., water) is dispersive for microwaves and need to be compensated for temperature and minute differences in ionic content (salt, acids) that can be dissolved and which lead to severe losses when frequencies exceed 1 GHz as shown in Table 1:

TABLE 1

| Attenuation distance for 100 dB path loss in water vs. frequency | 0.1 GHz | 0.1 GHz | 0.1 GHz |
|---|---|---|---|
| Pure water (NTP) | 100 m | 1 m | 1 cm |
| Sea water (NTP) | 10 cm | 5 cm | 1 cm |

Even more challenging is the shape characteristics. There seem to be approximately as many theoretical expressions for the shape dependence (See, for example, Klaus Kupfer(ed.) Electromagnetic Aquametry", Springer, 2005; J. B. Hasted, "Aqueous Dielectric", Champman and Hall, 1973; and Ari Sihvola, "Electromagnetic mixing formulas and applications", IEE, 1999.) as there are experiments. This may indicate the limits of measurement performance of such a system.

Instead of attempting to find a suitable multiparameter fit of an ill-defined volumetric measurement, the present invention includes the use of a local statistical measurement to characterize the flow. Near field microwave microscopy can be used to determine the structure of dielectric materials at resolutions comparable to lateral extension of a transmission line (TL) tip that scans a surface area. For liquid applications, such instruments can be achieved with micromachined probe tips to cover a length typical for the minimal feature size in multiphase flow, for example, a few millimeters. Mechanical scanning is not necessary because the fluid flow itself moves thereby providing a "scanning" of the mixture as it moves by the probe. Further, the modulation properties of the reflected microwave signal can be used as a measure and discriminator of the local constituents of the flow, i.e. the passage of a certain droplet volume will induce a modulation of the field typical for size of the droplet. By analyzing the signature and statistics of this modulation (frequency, phase amplitude), the concentration and nature of the embedded features can be measured in approximately the same way as shot noise of an electric current can be used to determine the typical size of the charges that are transported. Thus, statistics of the dynamic changes at a local point are used to estimate volumetric information. With the present invention, a statistical sampling technique is used to determine flow rate by extrapolating a local measurement to thereby infer the flow rate and composition of the total volume of fluid.

FIG. 1 is a simplified diagram of an industrial process 10 including a flowmeter or process device coupled to process piping 14. Process piping 14 carries a process fluid 16 which flows therethrough in the direction indicated. Flowmeter 12 can be of any particular configuration or design and is configured to measure flow of fluid 16, such as a multiphase fluid, through process piping 14. In the example of FIG. 1, the flowmeter 12 is shown as being coupled to a remote control room 20 by a process control loop 22. The process control loop 22 can be in accordance with any configuration such as a two-wire control loop based upon the HART® communication protocol, a 4-20 mA process control loop, a FieldBus based protocol, a wireless communication protocol, or others.

Flowmeter 12 includes a near field microwave probe 30 arranged to interact in the near field with process fluid 16. As discussed herein, near field microwave measurements are used to determine the flow rate of process fluid 16 through process piping 14.

Figure 2:
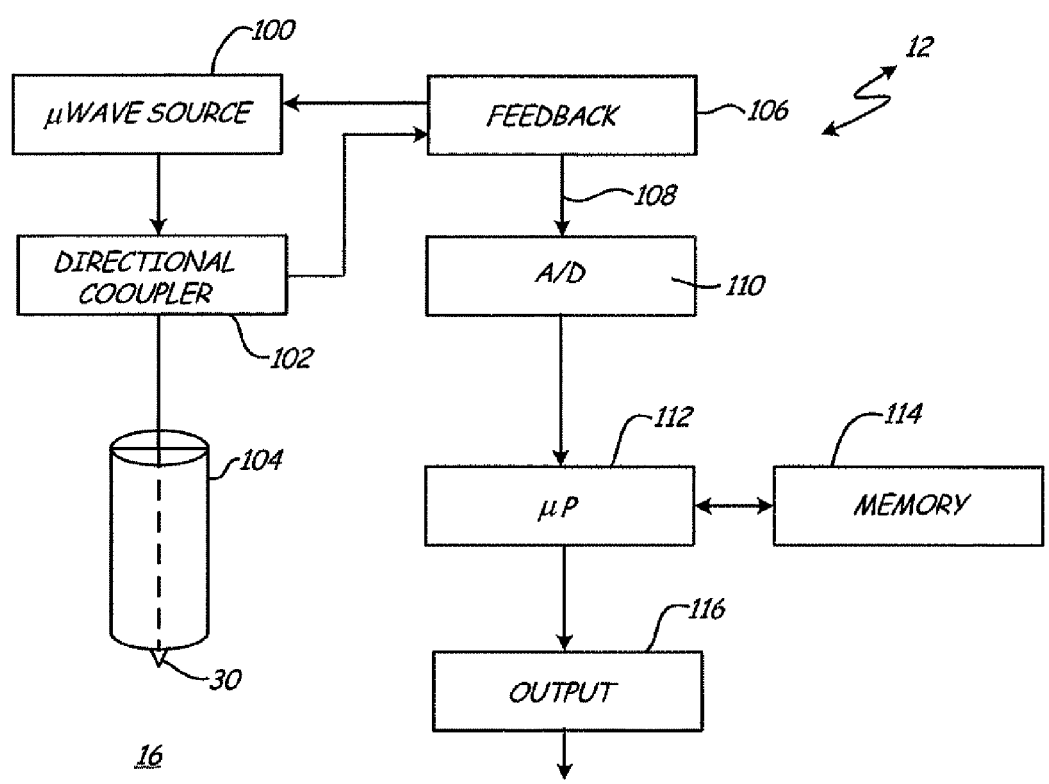
FIG. 2 is a simplified diagram showing components of the flow device of FIG. 1.

FIG. 2 is a simplified block diagram of flow measurement device 12 illustrating one example configuration. In FIG. 2, flow measurement device 12 includes a microwave source 100 which is configured to generate microwave signals provided to directional coupler 102. A coaxial cable 104 couples to a microwave probe tip 30 which is immersed in process fluid 16. Probe 30 interacts with the process fluid 30 in the near field through process fluid 16 in the near field with respect to the frequency of the microwaves generated by microwave source 100. The near field can be defined as measurements occurring within a distance which is much less than the wavelength of the microwaves.

The microwave near field interaction with process fluid 16 provides a microwave reflection signal back through probe 30, and coaxial cable 104 to directional coupler 102. This reflection signal is related to the size, shape, consistency, permeability, area, volume, and other features of components in a multiphase process fluid such as fluid 16. The "reflected signal" may be an electrical signal carried by probe 30 or may be an electrical characteristic of probe 30 which is measured with appropriate equipment. Directional coupler 102 provides the reflective signal to feedback circuitry 106. Feedback circuitry 106 is used to control microwave source 100 in accordance with known techniques. An output 108 from feedback circuitry 106 is provided to an analog to digital converter 110. The output 108 can comprise, for example, a voltage signal which is related to the near field reflection from the process fluid 16. A microprocessor 112, or other processing device, is configured to analyze the output from the analog to digital converter 110. Microprocessor 112 operates in accordance with instructions stored in a memory 114. The memory 114 can also be used for temporary or permanent storage of other data or information including configuration data.

Microprocessor 112 performs a statistical analysis on the output from analog to digital converter 112. For example, the frequency of peaks in the signal, the width of peaks in the output signal, the duration of peaks or other variations in the signal can be monitored and statistically analyzed. Statistics include average, median, variance, and spatial and temporal correlation coefficients etc. This data can be correlated with the flow rate of the process fluid 16.

Figure 3:
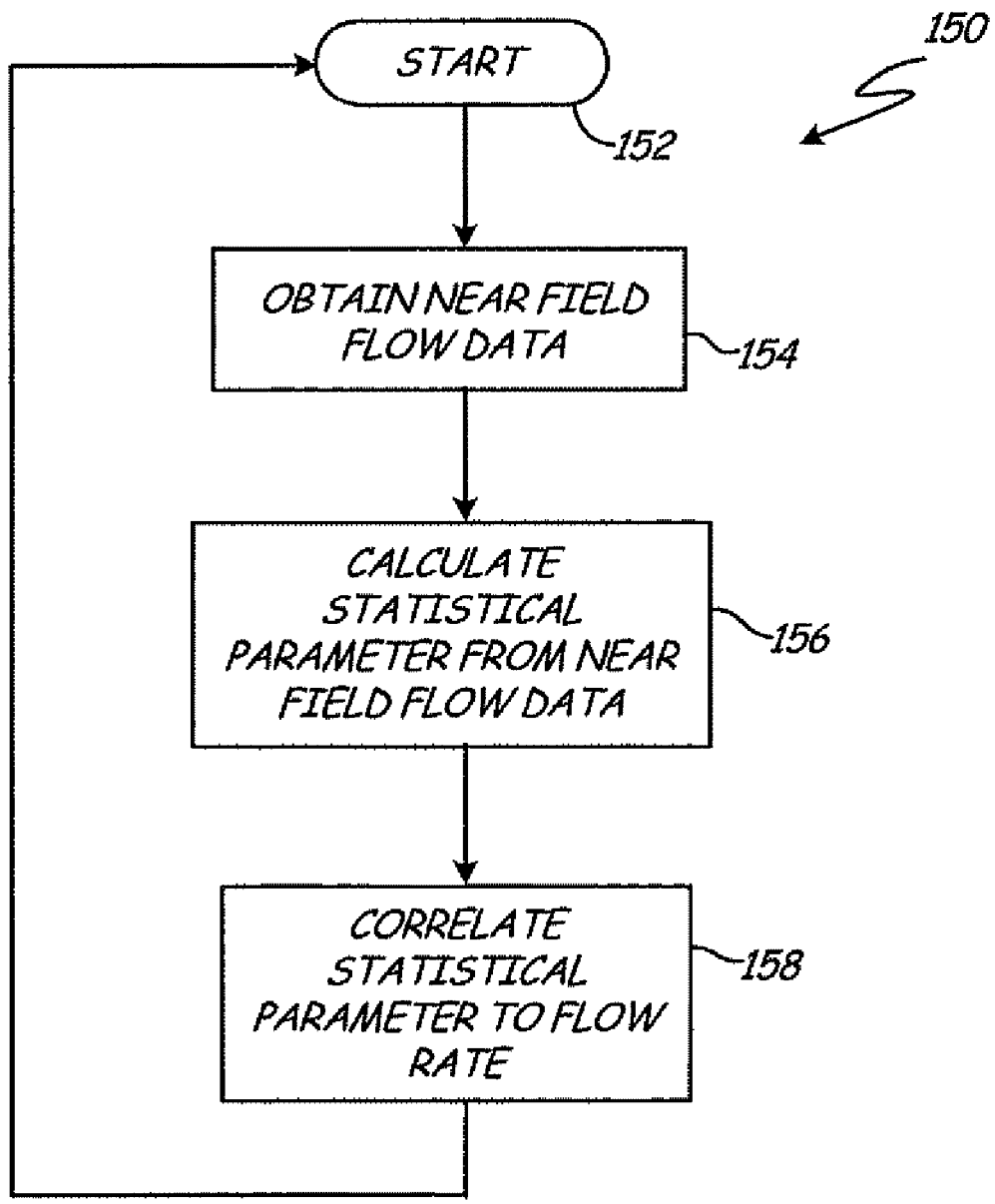
FIG. 3 is a simplified flow chart showing steps for use in determining the flow rate and composition of a multiphase process fluid.

FIG. 3 is a simplified flowchart showing steps in accordance with the present invention. These steps can be performed, for example, by device 12 shown above. The flowchart 150 begins at start block 152. At block 154, near field based flow data is obtained, for example, using the circuitry illustrated in FIG. 2. At block 156, a statistical parameter is calculated from the near field based flow data. This statistical parameter is then correlated to a flow rate at block 158. As a very simple example, a statistical parameter which identifies the average number of data peaks over a period of time can be used and correlated to a flow rate of the process fluid 16. This correlation can be determined experimentally and can be performed using known techniques such as through a polynomial curve field. Although only a single statistical parameter is discussed above, multiple statistical parameters can be used in the determination of flow rate. The correlation between the statistical parameter and the flow rate can be determined using modeling or other mathematical techniques, or can be determined empirically by performing tests on a particular type of process fluid. Note that the relationship between a statistical parameter of flow rate may vary depending on the composition of the multiphase process fluid. Control is returned to start block 152 and the measurement procedure is repeated.

One advantage of a near field probe is the ability to achieve a resolution that is suitable to characterize the features of the multi-phase flow, i.e. the ability to resolve the actual constituents at a given point in time. For some fluids, this cannot be achieved with the centimeter or larger wavelengths using the propagating modes used in current microwave multiphase flow sensors. While the propagating/resonant modes used typically require a certain geometry and/or metallic pipe walls, a near field probe is only dependent on the electromagnetic response in an area comparable to the probe lateral extension. The probe can be shaped to contain the complete circumference of the pipe, or several sensors may be used to obtain more accurate measurements. The local near field can be made significantly larger than the propagating field strength with the power restrictions applicable for industrial sensors. The use of several near field sensors may be used to measure typical relaxation effects that can further be used to characterize the fluid properties (e.g. Doppler of transmitted/reflected field as a function of polarizing field) giving additional information on the fluid at the point of measurement. This idea builds on the polarizability of the natural gas phase (methane), which has a measurable polarizability. An intense, pulsed electric field could therefore induce an electric dipole moment, which then decay and respond/reflect to microwave probing fields in an anisotropic pattern and with a certain Doppler shift, i.e. like a small moving microwave antenna. Electric and magnetic susceptibility is usually quenched in the liquid phase, where the molecular interactions dominate over external electromagnetic field effects.

Although the present invention has been described with reference to preferred embodiments, workers skilled in the art will recognize that changes may be made in form and detail without departing from the spirit and scope of the invention. In the discussion above, a microwave detector is used to measure the reflected near field signal. In the example of FIG. 2, this detector is formed by the directional coupler 102, feedback circuit 106, analog to digital converter 110. However, the present invention is not limited to this particular type of near field microwave detector and other circuits and configurations may be employed. This embodiment is provided for exemplary purposes only. In the example of FIG. 2, the microprocessor provides a flow calculation circuit for use in determining the flow rate. The microwaves discussed herein can be of a frequency range between about 0.3 GHz and about 3 GHz. Although only a single probe is shown, the invention may be implemented with multiple probes or through other techniques.

What is claimed is:

1. A flow meter for measuring flow rate of a process fluid, comprising:
   a microwave source configured to generate a microwave signal;
   a probe tip coupled to the microwave source and in near field proximity to the process fluid configured to apply the microwave signal to the process fluid;
   a microwave detector coupled to the probe tip configured to detect a reflected near field microwave signal from the process fluid in response to the applied microwave signal; and
   flow calculation circuitry configured to determine at least one of flow rate and flow composition of the process fluid as a function of the detected microwave signal.

2. The apparatus of claim 1 wherein the flow calculation circuitry determines a statistical parameter of the reflected near field microwave signal.

3. The apparatus of claim 1 including a directional coupler coupled to the probe tip.

4. The apparatus of claim 1 including feedback circuitry configured to provide an output based upon the reflected microwave signal.

5. The apparatus of claim 4 including an analog to digital converter configured to provide a digital output based upon an output from the feedback circuitry related to the reflected microwave signal.

6. The apparatus of claim 1 wherein the flow calculation circuitry comprises a microprocessor.

7. The apparatus of claim 2 wherein the statistical parameter comprises an average.

8. The apparatus of claim 1 including a coaxial cable which couples the microwave source to the probe tip.

9. The apparatus of claim 1 wherein the process fluid comprises a multiphase process fluid.

10. A method of measuring flow rate of a process fluid comprising:
    generating a microwave signal from a microwave source;
    applying the microwave signal to the process fluid with a probe tip which is near field proximity to the process fluid;
    detecting a reflected near field microwave signal from the probe tip which is generated in response to the applied microwave signal; and
    determining flow rate of the process fluid as a function of the detected microwave signal.

11. The method of claim 10 wherein determining flow rate includes determining a statistical parameter of the reflected near field microwave signal.

12. The method of claim 10 including providing a directional coupler coupled to the probe tip.

13. The method of claim 10 including providing a feedback circuitry configured to provide an output based upon the reflected microwave signal.

14. The method of claim 13 including converting an output from the feedback circuitry related to the reflected microwave signal to a digital signal.

15. The method of claim 11 wherein the statistical parameter comprises an average.

16. The method of claim 10 including providing a coaxial cable which couples the microwave source to the probe tip.

17. The method of claim 10 wherein the process fluid comprises a multiphase process fluid.

* * * * *